US012716761B2

(12) United States Patent
Touhent

(10) Patent No.: US 12,716,761 B2
(45) Date of Patent: Aug. 25, 2026

(54) SYSTEM FOR CARRYING OUT WORK PROCESSES ON WORKPIECES OR THE LIKE, AND METHOD FOR OPERATING THE SYSTEM

(71) Applicant: Robert Bosch GmbH, Stuttgart (DE)

(72) Inventor: Sami Touhent, Moessingen (DE)

(73) Assignee: Robert Bosch GmbH, Stuttgart (DE)

( * ) Notice: Subject to any disclaimer, the term of this patent is extended or adjusted under 35 U.S.C. 154(b) by 169 days.

(21) Appl. No.: 18/703,006

(22) PCT Filed: Dec. 13, 2022

(86) PCT No.: PCT/EP2022/085661
§ 371 (c)(1),
(2) Date: Apr. 19, 2024

(87) PCT Pub. No.: WO2023/110896
PCT Pub. Date: Jun. 22, 2023

(65) Prior Publication Data

US 2025/0003780 A1 Jan. 2, 2025

(30) Foreign Application Priority Data

Dec. 13, 2021 (DE) ..................... 10 2021 214 250.8

(51) Int. Cl.
*B05C 5/02* (2006.01)
*B05C 11/10* (2006.01)
(Continued)

(52) U.S. Cl.
CPC ........ *G01F 11/006* (2013.01); *B05C 11/1018* (2013.01); *B65B 43/54* (2013.01);
(Continued)

(58) Field of Classification Search
CPC ..... G01F 11/006; G01F 15/068; B05C 5/022; B05C 11/1018; B05C 13/02; B65B 57/00;
(Continued)

(56) References Cited

U.S. PATENT DOCUMENTS 12,434,339 B2 * 10/2025 Touhent .................. B23Q 7/14
2004/0131758 A1 7/2004 Jung et al.
(Continued)

FOREIGN PATENT DOCUMENTS

DE 102014214696 A1 1/2016
JP H0994500 A 4/1997
(Continued)

OTHER PUBLICATIONS

International Search Report for PCT/EP2022/085661, Issued May 15, 2023.

*Primary Examiner* — Frederick C Nicolas
(74) *Attorney, Agent, or Firm* — Norton Rose Fulbright US LLP

(57) ABSTRACT

A system for carrying out work processes on workpieces or the like. The system includes: a work surface on which are arranged first transport units which are movable independently of one another by electromagnetic drives and are designed to remove the workpieces or the like from a first conveying device, subsequently to supply them to various process stations, for carrying out the work processes on the workpieces or the like, and finally to transfer the workpieces or the like to a second conveying device after the work processes have been carried out. The process stations include at least one metering device with a liftable and lowerable metering element, in particular a metering needle, for dispensing a medium to the workpieces.

11 Claims, 4 Drawing Sheets

(51) Int. Cl.

| | |
|---|---|
| ***B05C 13/02*** | (2006.01) |
| ***B65B 43/54*** | (2006.01) |
| ***B65B 57/00*** | (2006.01) |
| ***B65B 57/12*** | (2006.01) |
| ***B65B 65/00*** | (2006.01) |
| ***B65G 3/00*** | (2006.01) |
| ***B65G 54/02*** | (2006.01) |
| ***G01F 11/00*** | (2006.01) |
| ***G01F 15/06*** | (2022.01) |
| *B65B 3/00* | (2006.01) |

(52) U.S. Cl.
CPC .............. *B65B 57/00* (2013.01); *B65B 57/12* (2013.01); *B65B 65/00* (2013.01); *B65B 65/003* (2013.01); *G01F 15/068* (2013.01); *B05C 5/022* (2013.01); *B05C 13/02* (2013.01); *B65B 3/003* (2013.01); *B65G 54/02* (2013.01)

(58) Field of Classification Search
CPC ....... B65B 57/12; B65B 65/00; B65B 65/003; B65B 43/54; B65B 3/003; B65G 54/02
See application file for complete search history.

(56) References Cited

U.S. PATENT DOCUMENTS

| | | | | |
|---|---|---|---|---|
| 2021/0094764 | A1 | 4/2021 | Umeyama et al. | |
| 2024/0316704 | A1* | 9/2024 | Touhent | B23P 23/06 |
| 2024/0400316 | A1* | 12/2024 | Touhent | B65G 54/02 |
| 2024/0409252 | A1* | 12/2024 | Touhent | B65B 3/28 |

FOREIGN PATENT DOCUMENTS

| | | | |
|---|---|---|---|
| JP | 2008006439 | A | 1/2008 |
| WO | 2021175885 | A1 | 9/2021 |

* cited by examiner control device
regulating device
120
110
100
22
21
38
39
36
10
34
37
40
12
1
31
35
26,32
25,28
17
18
16
45
47

SYSTEM FOR CARRYING OUT WORK PROCESSES ON WORKPIECES OR THE LIKE, AND METHOD FOR OPERATING THE SYSTEM

FIELD

The present invention relates to a system for carrying out work processes on workpieces or the like, in which in particular a position determination of a metering device or the metering needle thereof relative to a work surface of the system is advantageously carried out. Furthermore, the present invention relates to a method for carrying out such a position determination.

BACKGROUND INFORMATION

German Patent Application No. DE 10 2014 214 696 A1 describes a system for carrying out work processes on workpieces or the like. The conventional system is used to fill containers by means of metering devices, wherein the containers are removed from the region of a first conveying device by means of independently movable first transport units driven by electromagnetic drives. After the containers are removed, they are supplied by the first transport units to a metering device and, after dispensing a certain quantity of the medium, are transferred from the first transport units into a second conveying device.

For example, when converting metering devices serving to meter the media, when the system is newly configured or converted, or else after carrying out a certain number of metering processes, it is necessary or useful, in particular when dispensing a medium to a component for forming a sealing contour, to check whether the metering device or the metering needle has a desired target position relative to the work surface so that, for example, a sealing contour can be maintained with the required accuracy when dispensing the medium to the component which is conveyed into the region of the metering device on a first transport unit and is moved there relative to the metering device.

SUMMARY

A system according to the present invention for carrying out work processes on workpieces or the like may have an advantage that it allows for a position determination of a metering needle with respect to the position thereof above the work surface in a particularly simple and accurate manner.

The present invention includes deducing the height of the metering needle above the work surface or the horizontal position thereof relative to the work surface, either through contact of the metering needle with a height reference surface or through dispensing the medium to a target position on a target reference surface.

Against the background of the above explanations, it is therefore provided in a system according to an example embodiment of the present invention for carrying out work processes on workpieces or the like, for detecting a vertical distance of the metering element or similar element with respect to the work surface, contact detection means for detecting the contact of the metering element or similar element in a lowered position with a height reference surface arranged below the metering element or similar element on the first or a second transport unit which is movable by an electromagnetic drive are present, and/or that, for detecting a horizontal position of the metering element with respect to the work surface, position detection means for detecting the medium dispensed by the metering element onto target reference surface arranged a second transport unit which is movable by an electromagnetic drive are present.

Advantageous developments of the system according to the present invention for carrying out work processes on workpieces or the like disclosed herein.

According to an example embodiment of the present invention, in connection with a precise positioning of the first and/or second transport unit on the work surface below the metering device, it is provided that a control device of the system is present, which is at least indirectly designed to detect the horizontal position of the first and/or second transport unit on the work surface.

For detecting the contact of the height reference surface with the metering element or similar element, according to an example embodiment of the present invention, it is provided in a preferred configuration of the system that the contact detection means are designed to detect at least indirectly a height change of the height reference surface with respect to the work surface. The background in this respect is that the height reference surface positioned below the metering device by means of a first or a second transport unit experiences a force or an impulse upon contact with the metering element or similar element, which force or impulse acts on the first or second transport unit against the electromagnetic force serving as the lifting force, wherein the lifting force ensures that the first or second transport unit hovers above the work surface or is arranged at a specified distance from the work surface.

There are several possibilities for forming the height reference surface. Thus, in a first variant of the present invention, it is possible that the height reference surface is a surface of the workpiece or the like that faces the metering element or similar element and that is arranged on the first transport unit. In other words, this means that, with knowledge of the geometry or height of the first transport unit, of the distance of the first transport unit above the work surface, and of the geometry or height of the workpiece or the like when in contact with the metering element or similar element, a height of the metering element or similar element is determinable at the time of contact above the work surface.

In an alternative configuration of the present invention, it may also be provided that the height reference surface is formed on a reference element arranged on the second transport unit.

In a preferred development of the present invention, it can be provided that the contact detection means are designed to detect a change in a control value for achieving a specified distance of the first or the second transport unit above the work surface. This means that, through the indirect contact of the metering element or similar element with the first or second transport unit, the latter is pushed in the direction of the work surface or receives an impulse. In response thereto, a current flow through magnetic coils or a similar control value is however typically to be increased in order to adjust a desired target distance of the first or second transport unit above the work surface. This change in the current intensity or in the control value can be used to deduce a contact with the metering element or similar element.

According to an example embodiment of the present invention, for detecting the horizontal position of the metering element, it is also advantageous if the target reference surface has a marking, and that the position of the dispensed medium on the target reference surface with respect to the marking is detectable by the position detection means designed as an optical device. This utilizes the consideration that a geometry of crosshairs or the like as a marking or target location for dispensing the medium onto the target reference surface and a subsequent optical check as to the distance between the dispensed quantity of medium and the marking or the crosshairs can, for example, be used to deduce the horizontal position of the metering element when dispensing the medium.

In a development of the present invention, it is provided that the optical device is at least one image capturing camera or other device used for a position detection, and that the optical device is a process station used in the production operation of the system. Typically, during the production process, the optical device is responsible for checking whether the medium dispensed onto a component or the like has been dispensed in the position provided for this purpose. Thus, for carrying out the horizontal position determination of the metering element in connection with the use of the target reference surface, no additional image capturing device, which increases the equipment costs, is required, but rather a device used for the production process is utilized.

According to an example embodiment of the present invention, it may optionally also be provided that the target reference surface is designed as a touch-sensitive measuring surface. In this case, it is thus not absolutely necessary to detect a reaction force on the second transport unit upon contact with the metering element, but rather the event of the contact or of approaching the touch-sensitive measuring surface is detected. Such a configuration may possibly also have the advantage that the measuring surface is designed to detect not only the contact with the metering element but also the horizontal positioning thereof with respect to the measuring surface upon contact. Thus, such a sensitive measuring surface can be used not only to detect the vertical position of the metering element but also to detect the horizontal position of the metering element.

Furthermore, the present invention also comprises a method for carrying out a position detection of a metering element or similar element relative to a work surface in a system designed in the manner according to the present invention described above. According to an example embodiment of the present invention, the method comprises at least the following steps:

First, the height reference surface is positioned below the metering element or similar element. Subsequently, the metering element or similar element is lowered until the metering element or similar element comes into contact with the height reference surface, and the contact is detected. Finally, a distance of the metering element or similar element upon contact with the height reference surface is determined on the basis of the calculated distance of the height reference surface to the work surface on the basis of known heights of first and second transport units and on the basis of the distance of the first or second transport unit above the work surface.

Alternatively or additionally, the method may comprise at least the following steps:

First, the target reference surface is positioned below the metering element, and the metering element is preferably lowered to a height just above the target reference surface.

Subsequently, medium is dispensed onto the target reference surface by the metering element. Finally, the position of the dispensed medium relative to a marking on the target reference surface is determined by the position detection means.

Further advantages, features and details of the present invention become apparent from the following description of preferred embodiments of the present invention and from the figures.

DETAILED DESCRIPTION OF EXAMPLE EMBODIMENTS

Identical elements or elements with the same function are provided with the same reference signs in the figures.

Figure 1:
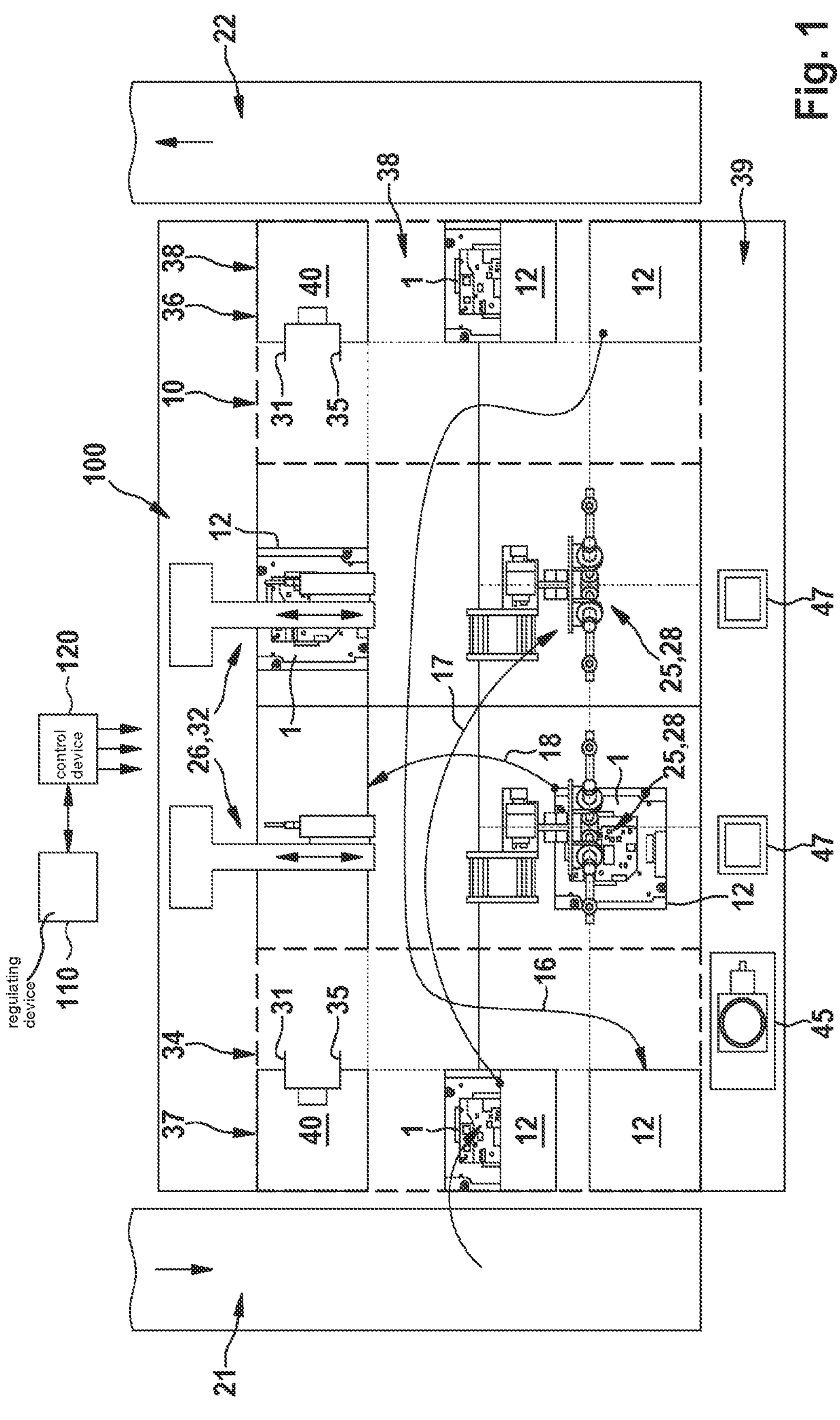
FIG. 1 shows, in a simplified representation, a system for carrying out work processes on workpieces or the like, according to an example embodiment of the present invention.

FIG. 1 is a highly simplified representation of a system 100 for carrying out work processes on workpieces 1 or the like. The workpieces 1 may, for example, be housing parts or the like, which are to be provided by means of the system 100 in a local or defined region of the housing parts with a pasty medium, for example for sealing or other purposes.

The system 100 comprises a work surface 10 which is arranged horizontally, wherein a plurality of first transport units 12, so-called movers, are located on the work surface 10. The first transport units 12 are controllable individually by a control device 120, wherein the first transport units 12 are arranged so as to be freely movable on the work surface 10. For this purpose, electromagnetic drives (not shown in detail) are used, which allow the first transport units 12 to execute any first conveying paths 16 to 18.

By way of example, the first transport units 12 serve to transport a respective workpiece 1 or the like in the region of the work surface 10. The workpieces 1 or the like are supplied to the system 100 laterally of the work surface 10 by means of a first conveying device 21, which is only shown symbolically and is preferably designed in the form of a linear conveyor, such as a chain conveyor, a belt conveyor, or the like. After carrying out work processes in the region of the system 100, the (processed) workpieces 1 or the like are transported away from the region of the work surface 10 or of the system 100 by means of a second conveying device 22, which is arranged on the side of the work surface 10 opposite the first conveying device 21 and is likewise shown purely symbolically. The second conveying device 22 is preferably likewise designed in the form of a linear conveyor.

By means of gripping devices or similar devices (not shown), the workpieces 1 or the like can be removed from the first conveying device 21 and placed on the first transport units 12. Likewise, after the work processes have been carried out, the gripping devices or the like (not shown) serve to lift the workpieces 1 or the like from the first transport units 12 and to supply them to the second conveying device 22.

For carrying out the work processes by means of the system 100, said system comprises, by way of example, two first process stations 25 and two second process stations 26 in the region of and above the work surface 10. The first process stations 25, which are arranged laterally next to one another, are designed as so-called dispensing stations with a metering device 28 which is fixedly arranged in the plane of the work surface 10 and in each case comprises a metering needle 30, which is arranged so as to be liftable perpendicularly to the plane of the work surface 10, as a metering element 29 for dispensing a liquid or pasty medium M. The second process stations 26 are, for example, test devices in the form of cameras or similar optical devices 32, which serve to monitor the work processes carried out by the first process stations 25 or to check them for proper execution.

The work surface 10 has, in each case laterally next to the process stations 25 and 26, a first and a second provision zone 34, 36, each marked with a dashed border, in the region of which first transport units 12 can be arranged. Furthermore, the provision zones 34 and 36, which are rectangular by way of example, serve, in particular in the region of waiting zones 37, 38, to receive at least one second transport unit 40 or to park it there. The drive of the second transport units 40 is designed in analogy to that of the first transport units 12, i.e., the second transport units 40 can likewise execute any path on the work surface 10 by means of electromagnetic drives. For this purpose, a corresponding control takes place by the control device 120 of the system 100. The second transport units 40 have a fork-shaped receptacle 31 for forming a standardized interface 35.

Furthermore, it can be seen in FIG. 1 that a region 39 is arranged on a longitudinal side of the work surface 10, in which region a calibration device 45, two weighing devices 47, or similar devices are, for example, arranged, which cooperate in particular with the second transport units 40 for carrying out so-called secondary processes.

In order to ensure that, during normal operation of the system 100, a metering needle 30 of the metering device 28 dispenses the medium M onto the workpiece 1 or the like, for example for forming a sealing contour at the locations provided for this purpose, it is necessary to know the correct position of the metering needle 30 both with respect to its distance to the work surface 10 and with respect to its horizontal position relative to the work surface 10.

For this purpose, it is explained that the system 100 comprises a regulating device 110, which is designed to allow both the first transport units 12 and the second transport units 40 to hover, or to be able to move them (FIG. 2), at a defined (short) distance a above the work surface 10. The regulating device 110, for example, detects a current intensity that must be induced into coils not shown, or another control value in order to ensure the desired distance a of the transport units 12, 40 above the work surface 10.

Furthermore, the system 100 comprises position detection means P, which at least indirectly cooperate with a control device 120 for the transport units 12, 40.

In addition, it is mentioned that the regulating device 110 and the control device 120 are defined as functional units and not necessarily as separate physical units. Rather, the regulating device 110 and the control device 120 are, in the most general sense, part of a control device which comprises still further functions of the system 100.

The position detection means P serve to detect the horizontal position or coordinates of the transport units 12, 40 in the region of the work surface 10. The position detection means P are already required so that, by a corresponding control of the electromagnetic drives by the control device 120, the transport units 12, 40 can execute the conveying paths 16 to 18 or the transport units 12, 40 can move to the desired position below the process stations 25, 26.

Figure 2:
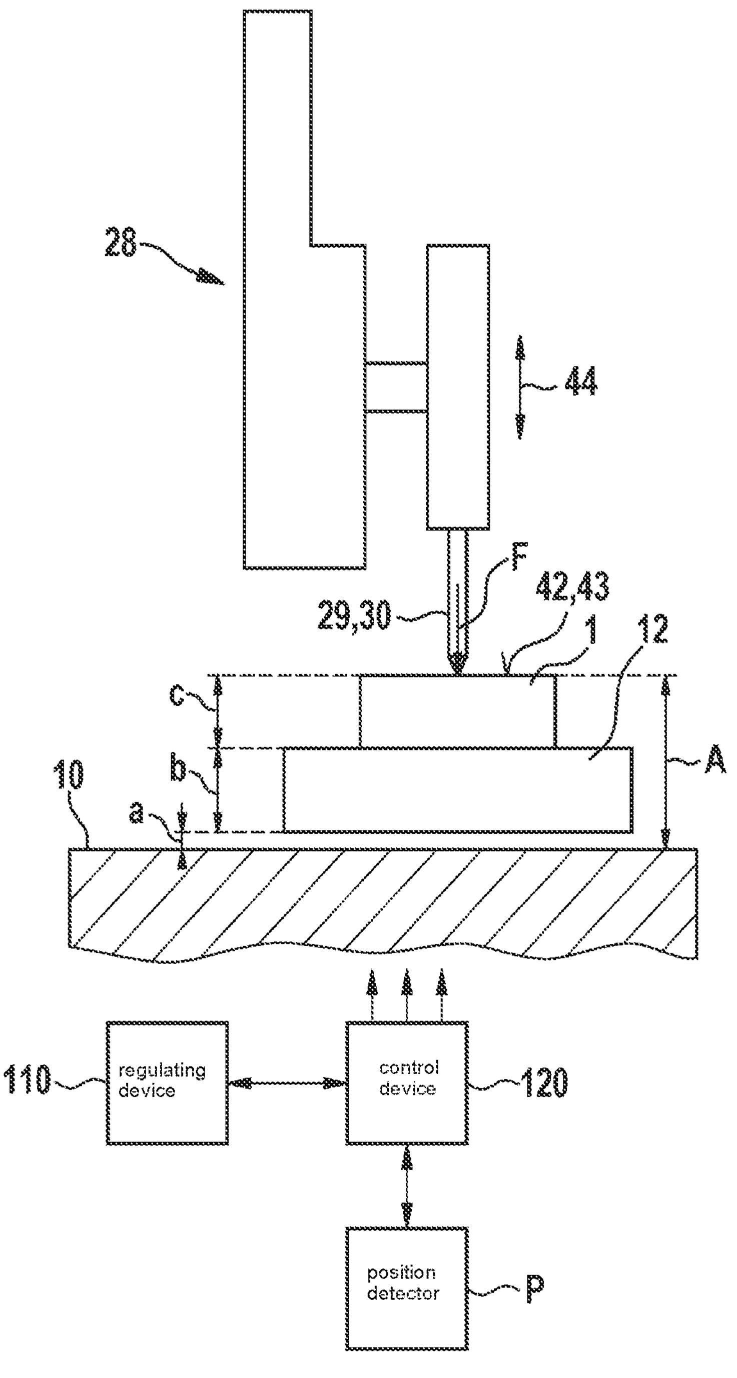
FIG. 2 and FIG. 3 each show a simplified side view in the region of a metering device of the system according to FIG. 1 for determining the height of a metering needle by means of different elements.

With reference to FIG. 2, a method for detecting the vertical distance A or the vertical position of the metering needle 30 above the work surface 10 by means of a first transport unit 12 and a workpiece 1 or the like located on the first transport unit 12 is explained in more detail below. In particular, it can be seen in FIG. 2 that the workpiece 1 or the like has, for example, a flat upper side 42, which forms a height reference surface 43, on the side facing the metering needle 30.

Furthermore, it is shown in FIG. 2 that the metering needle 30, which is arranged so as to be liftable and lowerable in the direction of the double arrow 44, has been moved from a raised position (not shown) to a lowered position, in which the metering needle 30 comes into contact with the height reference surface 43.

It is essential that, upon contact of the metering needle 30 with the height reference surface 43 on the workpiece 1 or the like, an additional force F or an impulse onto the first transport unit 12 is generated, which additional force or impulse must be compensated by means of the regulating device 110 serving as the contact detection means, for example through the requirement to increase the current intensity or to change the control value.

With knowledge of the (target) distance a of the first transport unit 12 from the work surface 10, of the height b of the first transport unit 12, and of the height c of the workpiece 1 or the like in the region of the height reference surface 43, the (absolute) position, the distance A of the metering needle 30 above the work surface 10, can thus be deduced. Since the vertical adjustment path of the metering needle 30 is detectable, as is conventional, by means of internal devices at the metering device 28, it is thus possible, with knowledge of the distance A during the production operation of the system 10, to adjust the desired height position of the metering needle 30.

Figure 3:
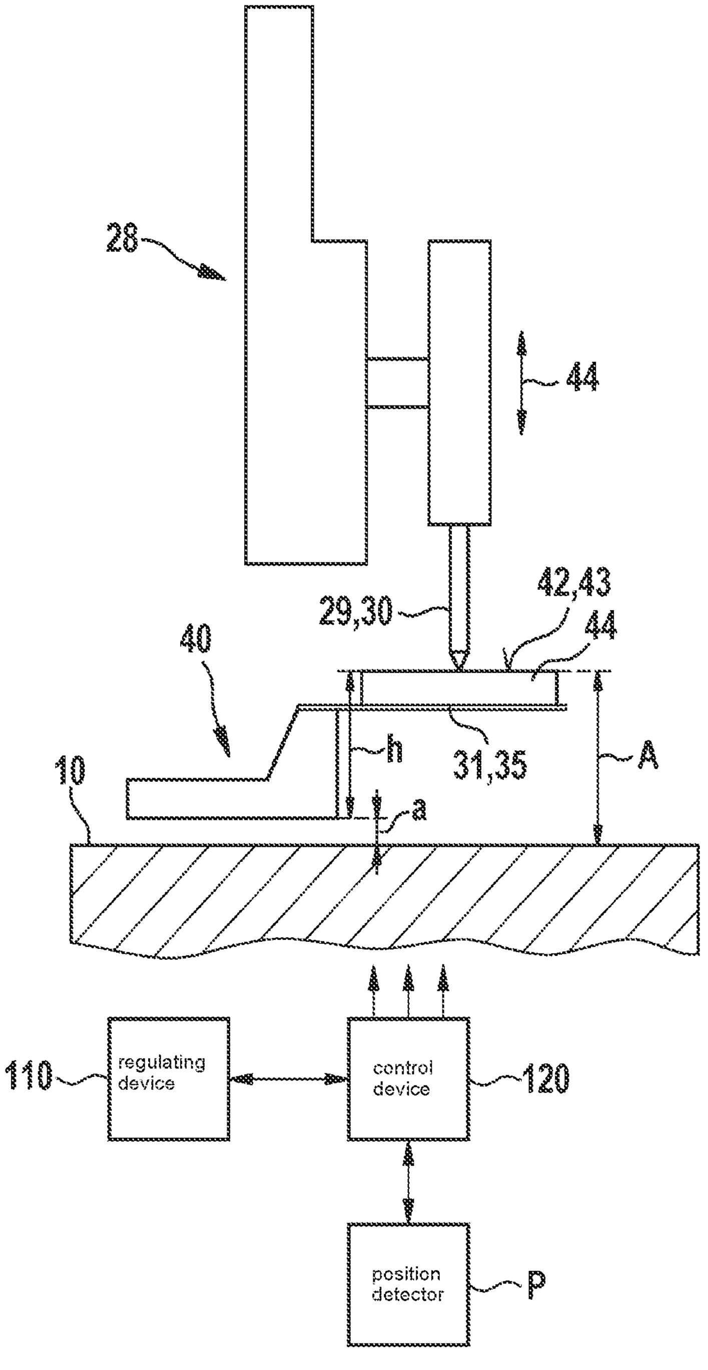

FIG. 3 shows that, instead of a first transport unit 12 with a workpiece 1 arranged thereon, a second transport unit 40 can also be used to form a height reference surface 43, which second transport unit, in the region of its receptacle 31 or interface 35, carries a reference element 44, which is, by way of example, plate-shaped and the upper side of which forms the height reference surface 43. With knowledge of the distance a and of the height h of second transport unit 40 and of reference surface 44, the distance A of the metering needle 30 above the work surface 10 at the time of contact of the reference surface 44 can thus likewise be shot.

Figure 4:
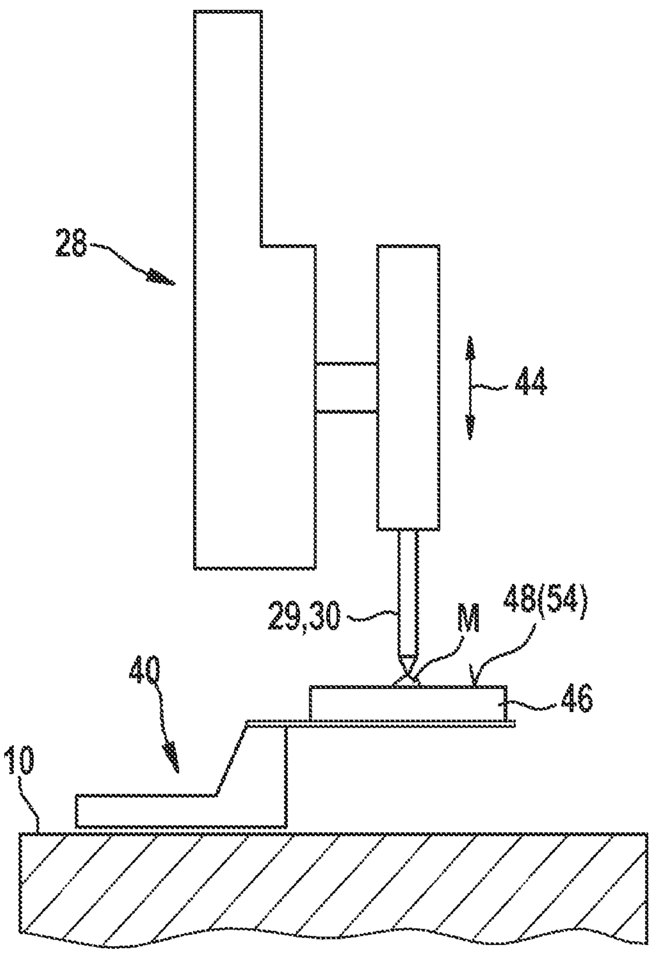
FIG. 4 shows a simplified side view corresponding to the representation of FIG. 2 using a target reference surface for dispensing a medium.
Figure 5:
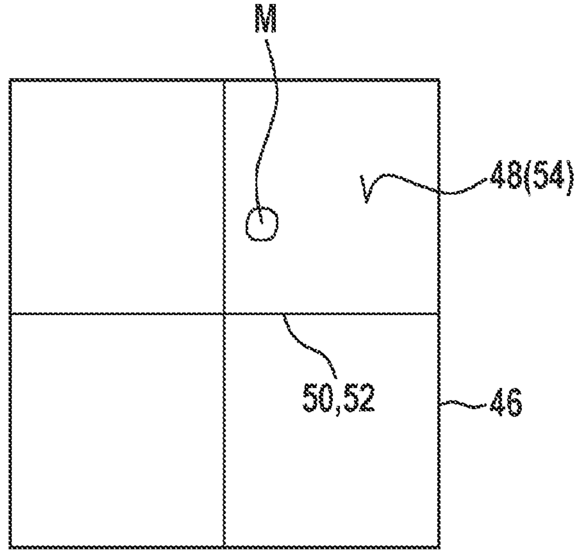
FIG. 5 shows a plan view of the target reference surface according to FIG. 4.

In FIGS. 4 and 5, a method for horizontal position determination of the metering needle 30 in the region of the work surface 10 is explained as follows below: A second transport unit 40 with a reference element 46 forming a flat surface is positioned below the metering needle 30. This reference element 46 has a target reference surface 48 on the side facing the metering needle 30. The target reference surface 48 also has a marking 50, for example in the form of crosshairs 52, which are centrally arranged according to FIG. 4 on the target reference surface 48.

When dispensing a (small) quantity of the medium M, the metering needle 30 is adjusted from a raised position to a lowered position, wherein the metering needle end of the metering needle 30 is preferably arranged only at a small distance above the target reference surface 48. Subsequently, the quantity of medium M is dispensed. FIG. 5 shows that the medium M has been dispensed onto the target reference surface 48 in the upper right quadrant of the crosshairs 52. During the dispensing of the medium M onto the target reference surface 48, the horizontal position of the second transport unit 40 or of the target reference surface 48 with respect to the work surface 10 was detected by the position detection means P. Subsequently, the second transport unit 40 is moved into the region of the second process station 26 in order there to detect the position of the medium M on the target reference surface 48 by means of the optical device 32 serving as the position detection means. The device 32 comprises suitable software for this purpose. With knowledge of the position of the target reference surface 48 at the time the medium M was dispensed, the horizontal position of the metering needle 30 relative to the work surface 10 can thus be deduced.

In addition, it is explained that the target reference surface 48 optionally also be designed in the form of a conventional touch-sensitive surface 54, for example, for so-called touch-screens. Such a touch-sensitive surface 54 can be used, when the metering needle 30 is lowered onto the surface 54, to make possible not only a (vertical) height determination of the metering needle 30 with respect to the work surface 10 but also a horizontal detection of the position of the metering needle 30. For this purpose, dispensing medium M is thus not necessary.

The system 100 described thus far can be altered or modified in many ways without deviating from the idea of the present invention. In particular, it is mentioned that, instead of the metering element 29, another liftable and lowerable element of the system 100 can also be used to perform a height determination of this element with respect to the work surface 10 when in contact with the height reference surface 43.

The invention claimed is:

1. A system for carrying out work processes on workpieces, comprising:

a work surface on which are arranged first transport units which are movable independently of one another by electromagnetic drives and are configured to remove the workpieces from a first conveying device, subsequently to supply the removed workpieces to various process stations for carrying out the work processes on the workpieces, and to transfer the workpieces to a second conveying device after the work processes have been carried out, wherein the process stations include at least one metering device with a liftable and lowerable metering element for dispensing a medium to the workpieces; and (i) a contact detection device configured to detect a vertical distance of the metering element with respect to the work surface, the contact detection device configured to detect a contact of the metering element in a lowered position with a height reference surface arranged below the metering element on a first transport unit of the first transport units or on a second transport unit movable by an electromagnetic drive, and/or (ii) a position detection device configured to detect a horizontal position of the metering element with respect to the work surface, the position detection device configured to detect the medium dispensed by the metering element onto a target reference surface arranged on the second transport unit movable by the electromagnetic drive.

2. The system according to claim 1, wherein the metering element is a metering needle.

3. The system according to claim 1, further comprising a control device configured to at least indirectly to detect the horizontal position of the first and/or second transport unit on the work surface.

4. The system according to claim 1, wherein the contact detection device is configured to detect at least indirectly a height change of the height reference surface with respect to the work surface.

5. The system according to claim 1, wherein the height reference surface is a surface of the workpiece that faces the metering element and is arranged on the first transport unit.

6. The system according to claim 1, wherein the height reference surface is formed on a reference element arranged on the second transport unit.

7. The system according to claim 1, wherein the contact detection device is configured to designed to detect a change in a control value for achieving a specified distance of the first or the second transport unit above the work surface.

8. The system according to claim 1, wherein the target reference surface has a marking, and a position of the dispensed medium on the target reference surface with respect to the marking is detectable by the position detection device configured as an optical device.

9. The system according to claim 8, wherein the optical device includes at least one image capturing camera or other device used for a position determination, and the optical device is a process station used in a production operation of the system.

10. The system according to claim 1, wherein the target reference is a touch-sensitive measuring surface.

11. A method for carrying out a position detection of a height-adjustable metering element relative to a work surface in a system, the system including:

a work surface on which are arranged first transport units which are movable independently of one another by electromagnetic drives and are configured to remove the workpieces from a first conveying device, subsequently to supply the removed workpieces to various process stations for carrying out the work processes on the workpieces, and to transfer the workpieces to a second conveying device after the work processes have been carried out, wherein the process stations include a height-adjustable metering element which is height-adjustable to the work surface for dispensing a medium to the workpieces; and (i) a contact detection device configured to detect a vertical distance of the metering element with respect to the work surface, the contact detection device configured to detect a contact of the metering element in a lowered position with a height reference surface arranged below the metering element on a first transport unit of the first transport units or on a second transport unit movable by an electromagnetic drive, and/or (ii) a position detection device configured to detect a horizontal position of the metering element with respect to the work surface, the position detection device configured to detect the medium dispensed by the metering element onto a target reference surface arranged on the second transport unit movable by the electromagnetic drive;

the method comprising the following steps:

(i) performing:

positioning the height reference surface below the metering element, lowering the metering element until the metering element comes into contact with the height reference surface, and detecting the contact, and determining a distance of the metering element upon contact with the height reference surface based on a calculated distance of the height reference surface to the work surface based on known heights of the first transport unit and the second transport unit and based on a distance of the first transport unit or the second transport unit above the work surface; and/or (ii) performing:

positioning the target reference surface below the metering element, and lowering the metering element to a height just above the target reference surface, dispensing medium onto the target reference surface using the metering element, and determining a position of the dispensed medium relative to a marking on the target reference surface using the position detection device.

* * * * *